US008097312B2

(12) United States Patent
Kristel

(10) Patent No.: US 8,097,312 B2
(45) Date of Patent: Jan. 17, 2012

(54) PAPER ROLL WITH PRE-CUT WINDOWS

(75) Inventor: Ira Kristel, Manhasset, NY (US)

(73) Assignee: Cenveo Corporation, Stamford, CT (US)

( * ) Notice: Subject to any disclaimer, the term of this patent is extended or adjusted under 35 U.S.C. 154(b) by 863 days.

(21) Appl. No.: 11/590,086

(22) Filed: Oct. 31, 2006

(65) Prior Publication Data

US 2008/0103035 A1 May 1, 2008

(51) Int. Cl.
*B60J 9/00* (2006.01)
*B32B 3/10* (2006.01)
*B65D 27/10* (2006.01)

(52) U.S. Cl. ..................... 428/34.3; 428/34.2; 428/34.7; 229/162.1; 229/162.4

(58) Field of Classification Search .................. 283/106; 493/223, 220, 248; 428/36.1, 35.7, 175; 229/162.1, 303, 87.06, 92.3, 68.14, 162.4
See application file for complete search history.

(56) References Cited

U.S. PATENT DOCUMENTS

| | | | | |
|---|---|---|---|---|
| 3,459,625 | A * | 8/1969 | Heller, Jr. et al. | 428/138 |
| 3,709,753 | A * | 1/1973 | Taylor | 156/108 |
| 4,320,868 | A | 3/1982 | Petersson et al. | |
| 5,842,722 | A | 12/1998 | Carlson | |
| 5,921,065 | A | 7/1999 | Slyster et al. | |
| 6,476,311 | B1 | 11/2002 | Lee et al. | |
| 6,692,819 | B1 | 2/2004 | Castle et al. | |
| 6,870,089 | B1 | 3/2005 | Gray | |
| 2003/0183680 | A1 | 10/2003 | Makofsky et al. | |
| 2006/0087113 | A1 | 4/2006 | Snyder et al. | |

OTHER PUBLICATIONS

International Search Report, PCT/US07/22976.

* cited by examiner

*Primary Examiner* — Rena Dye
*Assistant Examiner* — Ellen S Wood
(74) *Attorney, Agent, or Firm* — St. Onge Steward Johnston & Reens LLC

(57) ABSTRACT

A web of fibrous material having windows covered by a transparent material, and which is modified by compression, shaving, or embossing, so as to maintain a substantially uniform thickness throughout the length of the web. When the web is then wound onto itself, the resulting roll will have a substantially circular cross-section.

15 Claims, 6 Drawing Sheets

PAPER ROLL WITH PRE-CUT WINDOWS

BACKGROUND OF THE INVENTION

High speed envelope manufacturing machines must meet the demands to produce large quantities of high quality, envelopes in an inexpensive manner. These envelope machines have the capability of producing envelopes at speeds well in excess of 1,000 envelopes per minute and are typically microprocessor controlled high speed web machines which are designed to perform every aspect of envelope manufacturing, beginning with the unwinding of a continuous web of fibrous material. The fibrous material is then fed through the envelope machine where it may be printed with desired information, provided with an adhesive material, cut to create a window area, provided with a transparent window for the window area, cut to form individual envelope units, and folded over a desired package as to create a stuffed envelope.

A shortcoming of the aforementioned envelope manufacturing machines is that they must operate at a relatively slow rate when producing envelopes with windows. That is, the speed is limited by the speed at which a window area can be created in the fibrous material and by the rate at which a transparent window can be placed overtop the window area. A manufacturer will therefore have to choose between producing envelopes at a slower rate and producing envelopes that do not contain a window. However the envelope windows are beneficial in that they allow for the display of information about the contents of the envelope or about the individual to whom the envelope will be sent, such as the recipient's address.

To increase the rate of the envelope manufacturing process, the roll of fibrous material may include pre-cut openings and transparent windows. However, the roll of fibrous material consists of thousands of envelope units and will therefore contain thousands of transparent windows. These transparent windows typically have a thickness on the order of $1.25*10^{-3}$ inches, which will add to the total thickness of the envelope unit at the areas in which the window cover is placed over top of the fibrous material.

A web of fibrous material with transparent windows will therefore have a non-uniform thickness. When this web is wound into a roll, it will have an asymmetrical diameter. Given the size and weight of the roll and the speed at which the roll is unwound during the envelope making process, any asymmetry in the roll will cause the unwinding process to be uneven and erratic. In turn, this can cause shuddering or shaking in the envelope machine, which can result in damage to the machine or fibrous material. For this reason, it is important that the cylinder of fibrous material have a circular cross-section when it is wound.

SUMMARY OF THE INVENTION

An aspect of the present invention is to create a web of fibrous material having transparent windows, while maintaining a substantially uniform thickness throughout the length of the web. When the web is then wound onto itself, the resulting roll will have a substantially symmetrical diameter throughout. In this manner, the problems associated with unrolling asymmetrical rolls at high speed can be avoided.

In one embodiment, a portion of the web of paper is embossed either before or after placement of the window, so as to increase the thickness of the paper. However, the areas that are covered by the transparent window are not embossed, so that the thickness of the paper at the covered areas is less than the thickness of the paper at the non-covered areas. The embossing is performed so that the increase in thickness of the paper at the non-covered areas is substantially the same as the thickness of the transparent window. Therefore the combined thickness of the transparent window and paper at the covered areas will be substantially uniform to the thickness of the embossed paper at the non-covered areas. In this way, when the paper is wound upon its self along its length, the resulting roll will have a substantially symmetrical diameter.

In another embodiment, a portion of the web of paper is shaved off as to decrease the thickness of the paper at the areas which are covered by the transparent window. The shaving is performed so that the decrease in thickness of the fibrous material at the covered area is substantially uniform to the thickness of the window cover itself. As a result, when the transparent window is placed over top the open area, the combined thickness of the transparent window and the paper at the covered area will be substantially uniform with the thickness of the paper at the non-covered area. Therefore, when the paper is wound upon itself along its length, the resulting roll will have a substantially symmetrical diameter.

In another embodiment, a portion of the web of paper is compressed either before or after placement of the window, so as to decrease the thickness of the paper at the areas which are covered by the transparent window. The compression is performed so that the decrease in thickness of the paper at the covered area is substantially uniform to the thickness of the window cover itself. As a result, when the transparent window is placed over top the open area, the combined thickness of the transparent window and the paper at the covered area will be substantially uniform with the thickness of the paper at the non-covered area. Therefore, when the paper is wound upon itself along its length, the resulting roll will have a substantially symmetrical diameter.

In other embodiments, a combination of embossing, shaving, and/or compression may be used in order to create a substantially uniform thickness across the paper at both the covered areas and non-covered areas.

DETAILED DESCRIPTION

Prior to describing the present invention in detail, it is noted that the term "substantially" as used throughout this specification denotes both the precise and imprecise case of the adjective it modifies. For example, the phrase "substantially circular cross-section" as used in this specification is intended to denote both the case in which the "cross-section" is precisely circular and the case in which the "cross-section" is approximately, but not exactly, circular.

The present invention pertains to a web of fibrous material containing a plurality of transparent windows, which can be wound into a cylinder or roll of a substantially uniform diameter.

Figure 1:
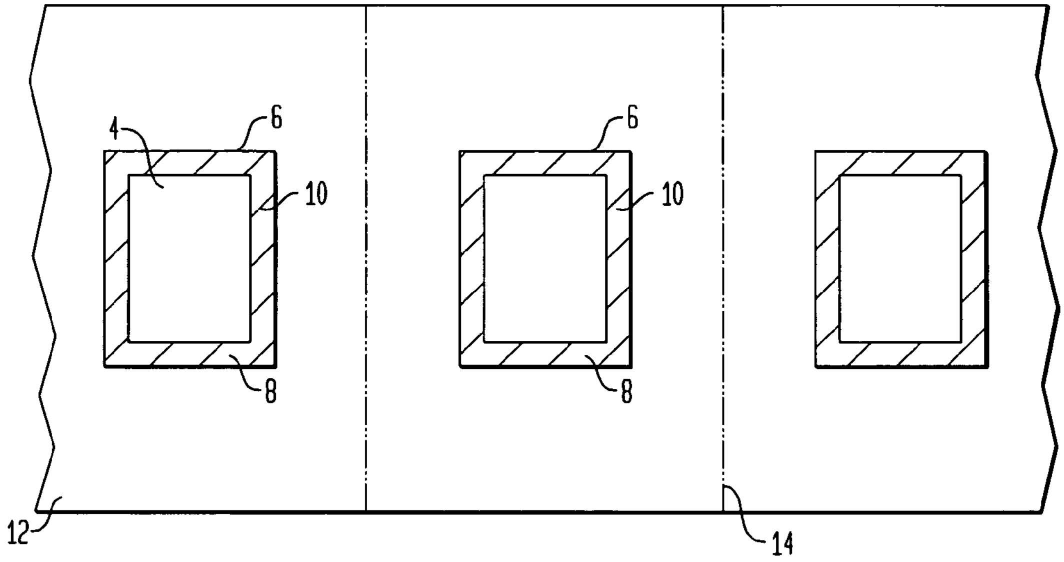
FIG. 1 shows a length of fibrous material containing open areas with transparent windows
Figure 2:
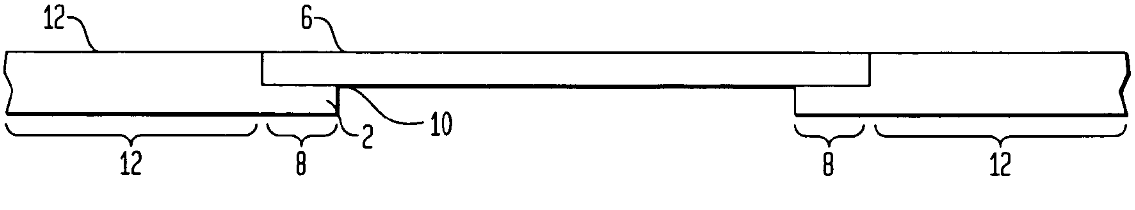
FIG. 2 is a cross-sectional view of the fibrous material shown in FIG. 1, wherein the fibrous material has been formed so as to have a substantially equivalent thickness throughout.

An embodiment of the present invention is shown in FIGS. 1 and 2. In this embodiment, a web of fibrous material 2 includes a plurality of open areas 4 that are each covered by a transparent window 6. The transparent window 6 extends over a portion of the fibrous material 2 as to create a plurality of covered areas 8. An adhesive 10 holds the transparent window 6 to the covered areas 8. The portion of the fibrous material that is not part of the covered area 8 is the non-covered area 12. As shown in FIG. 2, the web of fibrous material 2 has substantially the same thickness along the non-covered area 12 as the combined thickness of the transparent window 6, the adhesive 10, and the fibrous material 2 at the covered area 8.

The fibrous material 2 may have any variety of length, width, and thickness that is desired for the manufacturing of an envelope. Typically, the distance between each open area 4 will be constant throughout the length of the fibrous material 2, however the distance between each open area 4 will be determined by the size of the envelopes that will be created from the web of fibrous material 2. In addition, the perimeter of open area 4 can be made of any dimension required to allow the contents of the manufactured envelope to be seen before the envelope is opened. The lines 14 on the web of fibrous material 2 designate where the web of fibrous material 2 may be separated when the web is fed into an envelope manufacturing machine.

Figure 3:
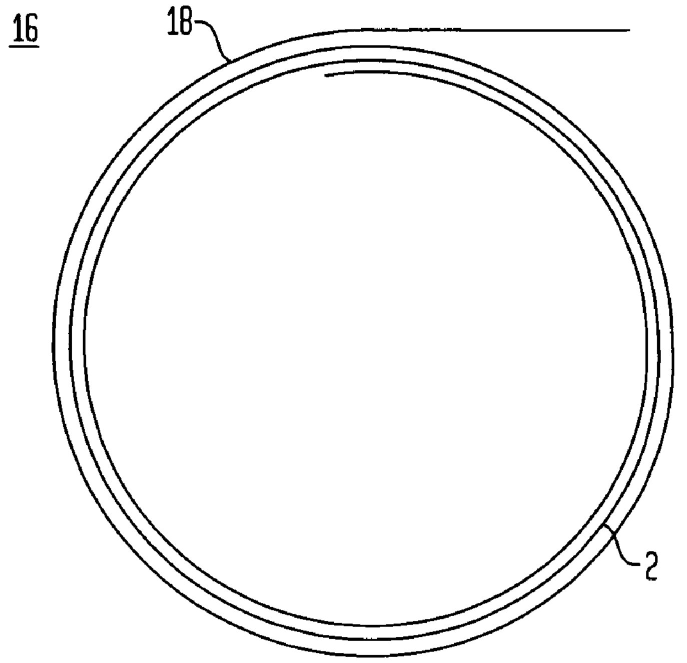
FIG. 3 shows a length of fibrous material of FIG. 2 that has been wound into a roll.

FIG. 3 shows the fibrous material of FIGS. 1 and 2 after it has been wound into a roll or cylinder 16. Given the uniformity of thickness between the fibrous material 2 at the covered area 8 and the combination of materials at the non-covered area 12, the cylinder 16 has an outer surface 18 having a substantially circular cross-section.

Figure 4:
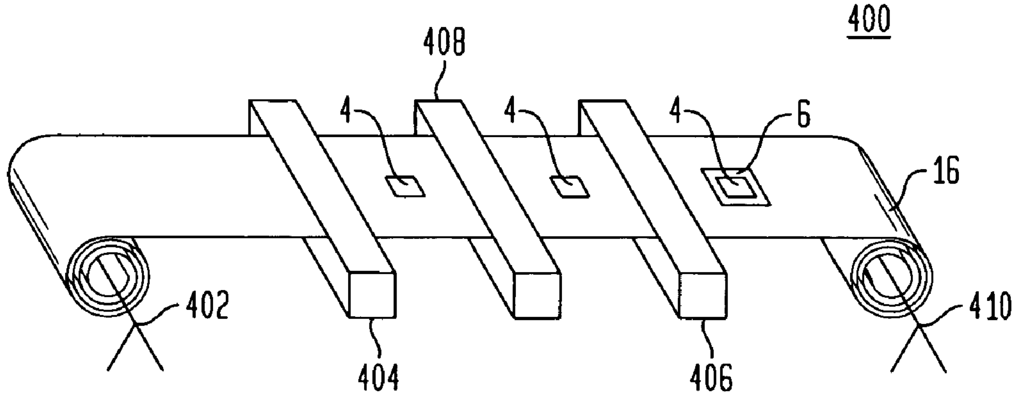
FIG. 4 is a machine operative to create a roll of fibrous material with pre-cut windows according to the present invention.

One embodiment of the present invention includes the method of manufacturing a web of fibrous material with pre-cut windows, as shown in FIG. 4. FIG. 4 shows a machine 400 that is operative to process a web of fibrous material. The machine 400 includes a feeding section 402, a cutting section 404, a window application section 406, a material modifying section 408, and a winding section 410.

In the preferred embodiment of the present invention, fibrous material is processed using the FIG. 4 apparatus in the following manner. The feeding section 402 feeds the fibrous material into the machine 400. The cutting section 404 uses conventional cutting techniques to cut out a plurality of predetermined areas from the fibrous material. The material modifying section 408 modifies the thickness of the fibrous material 2. The window application section 406 uses conventional techniques to apply a window 6 over top the open areas 4, including the application of an appropriate adhesive. The modifying section 408 is configured to modify the fibrous material 2, so as to create uniformity between the thickness of the non-covered area 12 and the thickness of the materials at the covered areas 8, which will include the window 6, fibrous material 2, and any adhesive that might have been applied by the application section 406. The winding section 410 will then wind the fibrous material 2 in to a cylinder 16. Given the modifications that are preformed on the fibrous material, the cylinder will have a substantially circular cross-section throughout its length.

Figure 4A:
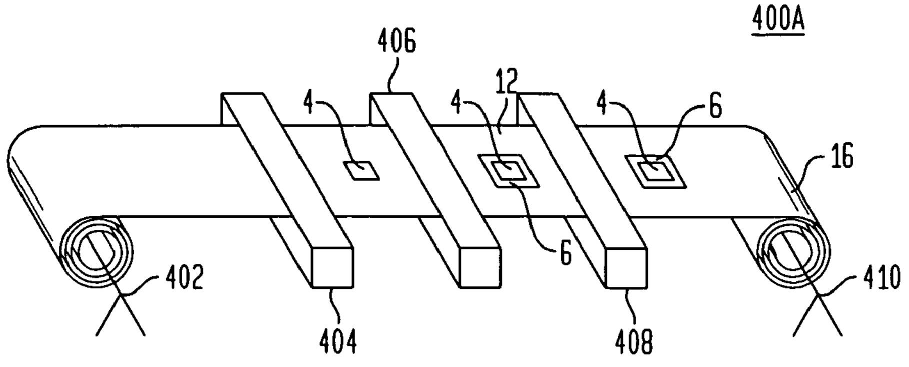

FIG. 4A shows a machine 400A wherein the window application section 406 and material modifying section 408 of FIG. 4 are interchanged. Therefore, the machine 400A of FIG. 4A places the windows 6 over the open areas 4 prior to the modification of the fibrous material 2.

Figure 5:
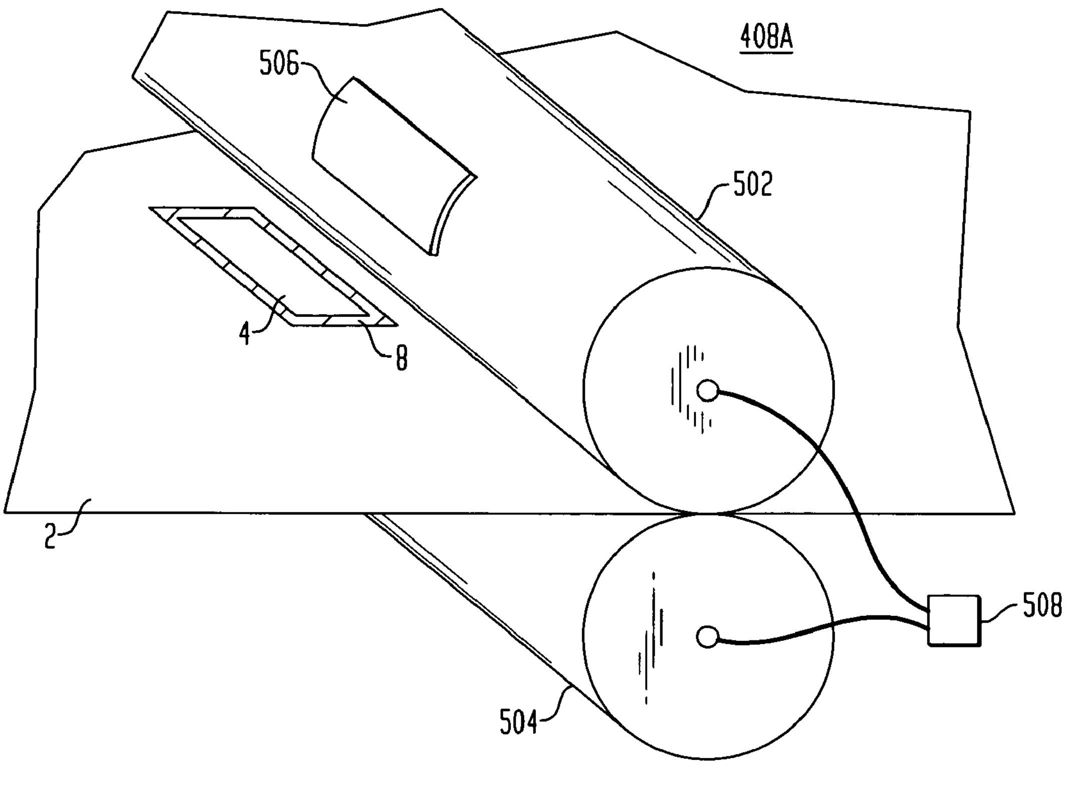
FIG. 5 shows a section of the machine in FIG. 4 wherein the fibrous material is compressed.

In one embodiment of the present invention, the process of modifying the fibrous material is preformed by compressing a portion of the fibrous material. FIG. 5 shows a material modifying section 408A, in which compression is used. The material modifying section 408A includes a top roller 502 and a bottom roller 504, which are circular-cylinders that are positioned so that the fibrous material 2 may contact at least one of the rollers and may pass in between them. The top roller 502 contains a raised plate 506 that is made to sit above the surrounding surface of the top roller 502. Upon entering the material modifying section 408A, the fibrous material 2 will preferably contain a plurality of open areas 4.

The raised plate 506 has a dimension that is substantially equivalent to the covered area 8. In addition, the raised plate 506 is positioned as to come in contact with the entire area 8 and, the surface of the top roller 502 will have a circular circumference that is equal to the spacing between each window. In this way, the raised plate 506 will come into contact with entirety of each area 8.

Upon passing through the material modifying section 408A, each of the areas 8 will be compressed by the raised plate 506. As shown in FIG. 4, a transparent window will then be placed overtop the area 8. In turn, the thickness of the non-covered area 12 will have a thickness that is substantially equivalent to the thickness of the covered area 8 after the window has been applied. In order for the raised plate to exert the proper force against the covered area 8, the pitch between the rollers 502 and 504 is preferably adjustable by a micrometer 508. The spacing between the rollers 502 and 504 that is required to allow for proper compression will be determined by the type of fibrous material 2 that is being used. In addition, the compression required will be subject to the thickness of the fibrous material 2, the thickness of the window, and the amount of adhesive that is used to attach the window.

Figure 6:
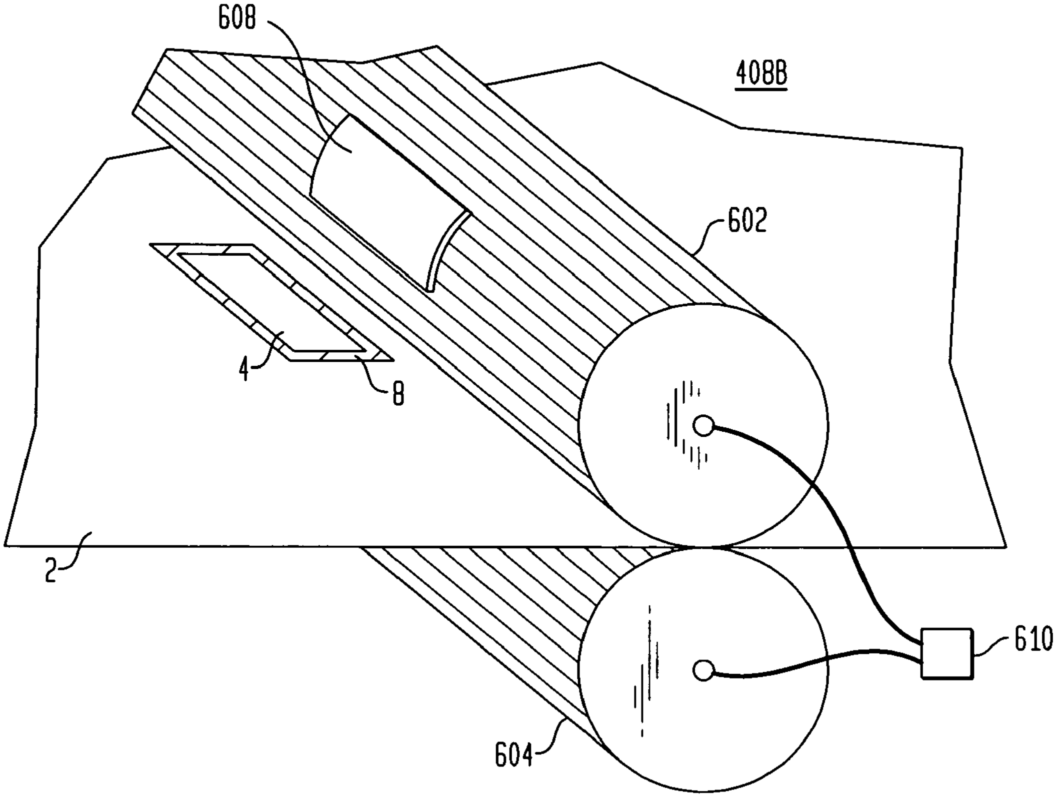
FIG. 6 shows section of the machine shown in FIG. 4 wherein the fibrous material is embossed.

In another embodiment of the present invention, the process of modifying the fibrous material is preformed by embossing the fibrous material as to increase its thickness. FIG. 6 shows a material modifying section 408B, in which compression is used. The material modifying section 408B includes a top roller 602 and a bottom roller 604, which are circular-cylinders that are positioned so that the fibrous material 2 may contact at least one of the rollers and may pass in between them. The surface of top roller 602 and the surface of the bottom roller 604 contain an embossing pattern 606. However, both the surface of the rollers 602 and 604 will each contain non-embossing areas 608, which will not contain the embossing pattern 606. Upon entering the material modifying section 408B, the fibrous material 2 will contain a plurality of open areas 4 surrounded by area 8, which will eventually be covered by a transparent window.

The non-embossing areas 608 have a dimension that is substantially equivalent to the window covered area 8. In addition, the non-embossing areas 608 are positioned as to come in contact with the area 8, and the surface of the top roller 602 and bottom roller 604 will have a circular circumference that is equal to the spacing between each window 6. In this way, the non-embossing area of the top roller 602 and bottom roller 604 will come into contact with entirety of each window covered areas 8. Upon passing through the material modifying section 408B, the entirety of the fibrous material 2 will be embossed with the exception of areas 8. After the transparent windows are applied, the covered area 8 will have a substantially uniform thickness in relation to the non-covered area of the fibrous material 2.

Any conventional embossing pattern may be used for the rollers 602 and 604, such as pebbles, linen, grooves vertical and linen weave.

Figure 7:
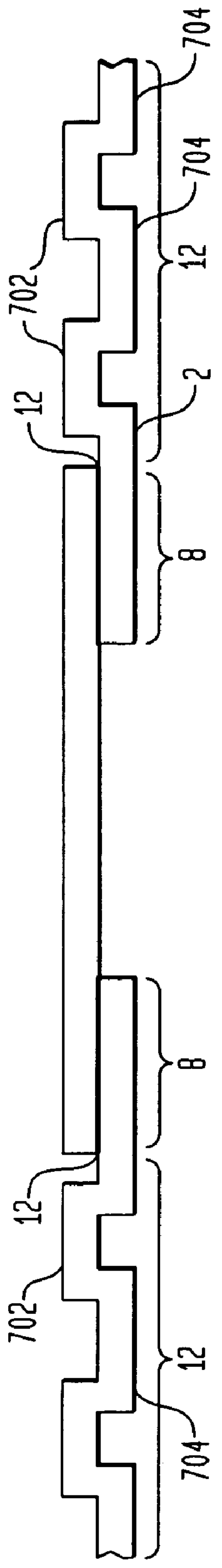
FIG. 7 is a cross section of fibrous material that has been embossed according to the present invention.

FIG. 7 shows the resulting web of fibrous material 2, upon having passed through the material modifying section 408B and the window application section 406, wherein an embossing pattern of parallel lines has been used. As shown in FIG. 7 the pitch between the upper surfaces 702 and the lower surfaces 704 of the fibrous material 2, will be increased from the embossing process. In this way, the thickness of non-covered area 12 will be substantially equivalent to the combined thickness of the window covered areas 8, including the window 6 and any adhesive 12 that is used.

The spacing between the rollers 702 and 704 of FIG. 7 is preferably adjustable by a micrometer 708, so that the embossing process increases the thickness of the non-covered area 12 by an amount sufficient to make it equivalent to the thickness of the covered area 12. The pitch between the rollers 602 and 604 that is required to allow for sufficient embossing will be determined by the type of fibrous material 2 that is being used, the thickness of the fibrous material 2, the thickness of the window 6, and the amount of adhesive that is used to attach the window 6.

Figure 8:
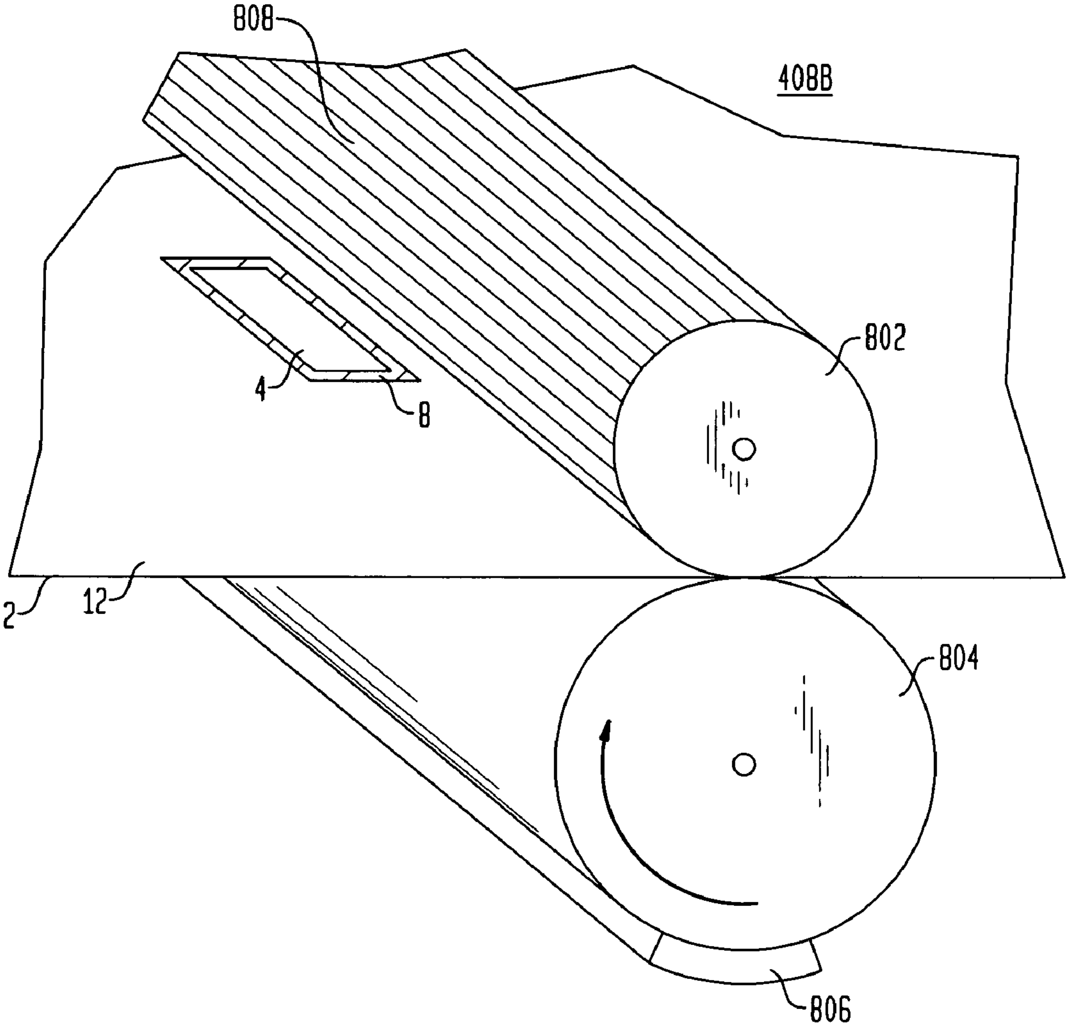
FIG. 8 shows a section of a machine operable to create a fibrous material of the invention through grinding or shaving.

In yet another embodiment of the present invention, the process of modifying the fibrous material is preformed by grinding or shaving off a portion of the fibrous material as to decrease its thickness. FIG. 8 shows a material modifying section 408C, in which shaving is used. The material modifying section 408C includes a shaving or grinding tool 802 and a bottom roller 804. The bottom roller 804 is a circular-cylinder that is positioned so that the fibrous material 2 may contact it as the fibrous material 2 passes through the material modifying section 408C. The surface of the bottom roller 804 contains a raised printing plate 806. The grinding tool 802 rotates at high speeds and contains an abrasive surface 808 capable of grinding or shaving the fibrous material 2 upon contact.

In order for the fibrous material 2 to be modified by the grinding tool 802, the fibrous material 2 should enter the material modifying section 408C before the windows have been applied to the open areas 4. The raised printing plate 606 has a dimension that is substantially equivalent to the area of the window that will be applied, covered area 8. The raised printing plate 806 is positioned as to come in contact with the entire covered area 8, and the surface of the bottom roller 804 will have a circular circumference that is equal to the spacing between each open area 4. As the raised plate 806 comes into contact with the fibrous material 2, it will bring the fibrous material 2 into contact with the grinding tool 802. Upon passing through the material modifying section 408C the covered area 8 will be reduced in thickness The spacing between the grinding tool 802 and bottom roller 804 is preferably adjustable by a micrometer 808, so that the shaving process decreases the thickness of the covered area 8 by an amount sufficient to compensate for the increased thickness from the application of a window. The pitch between the grinding tool 802 and the bottom roller 804 that is required to allow for sufficient shaving will be determined by the type of fibrous material 2 that is being used, the thickness of the fibrous material 2, the thickness of the window, and the amount of adhesive that is used to attach the window.

In another embodiment of the material modifying section 408C, the grinding tool 802 contains blades, which can shave off the desired portions of the fibrous material 2.

In yet another embodiment, the material modifying sections 408A and 408B of machine 400 may be located so as to modify the fibrous material 2 after the window 6 has been applied over top open area 4. In addition, the material modifying sections 408A, 408B, or 408C may be used in combination in order to create a fibrous material with pre-cut windows having a substantially uniform thickness throughout.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A roll of material used for the production of paper products that include a transparent window within a surrounding non-transparent area, the material being substantially planar and having a rectangular shape when laid flat and possessing the characteristic that when it is rolled up along its length the resulting roll of material has a substantially circular-cylindrical shape, the material comprising:

a) a paper substrate including a plurality of open areas formed such that each open area has a perimeter that is contacted along its entirety by the paper substrate; and;

b) a multiple of windows that are substantially planar when laid flat;

c) wherein the multiple of windows are arranged to cover the respective open areas and wherein the multiple of windows extend over the perimeter of each open area so as to create a plurality of covered areas;

d) wherein the paper substrate is modified such that when the material is rolled up along its length the resulting roll of material has a substantially circular cross-section; and e) wherein the combined thickness of the transparent window and paper at the plurality of covered areas is uniform to the thickness of the paper at the surrounding non-covered areas, such that the roll of material can be unrolled at high speeds without the uneven and erratic unwinding associated with unrolling asymmetrical rolls.

2. A roll of material of claim 1 wherein the paper substrate is modified by embossing a portion of the paper substrate.

3. A roll of material of claim 1 wherein the paper substrate is modified by shaving off a portion of the paper substrate.

4. A roll of material of claim 1 wherein the paper substrate is modified by compressing the paper substrate.

5. A roll of material of claim 1 wherein the paper substrate is modified by embossing a portion of the paper substrate and shaving off a portion of the paper substrate.

6. A roll of material of claim 1 wherein the paper substrate is modified by embossing a portion of the paper substrate and compressing a portion of the paper substrate.

7. A roll of material of claim 1 wherein the paper substrate is modified by embossing a portion of the paper substrate, compressing a portion of the paper substrate, and shaving off a portion of the paper substrate.

8. A method for manufacturing a roll of material used for the production of paper products that includes a transparent window within a surrounding non-transparent area, the material being substantially planar and having a rectangular shape when laid flat and possessing the characteristic that when it is rolled up along its length the resulting roll of material has a substantially circular-cylindrical shape, the steps comprising:

a) providing a paper substrate;

b) cutting a plurality of open areas into the paper substrate such that each open area has a perimeter that is contacted along it entirety by the paper substrate;
c) applying a multiple of window that are substantially planar when laid flat to cover the respective open areas;
d) modifying the paper substrate as such that when the material is rolled up along its length the resulting roll of material has a substantially circular-cylindrical shape; and
e) wherein the combined thickness of the transparent window and paper at the plurality of covered areas is uniform to the thickness of the paper at the surrounding non-covered areas, such that the roll of material can be unrolled at high speeds without the uneven and erratic unwinding associated with unrolling asymmetrical rolls.

9. A method of claim 7 wherein the step for applying the window material is performed after the step of modifying the paper substrate.

10. A method of claim 7 or claim 8, wherein the step for modifying the paper substrate includes embossing a portion of the paper substrate.

11. A method of claim 7 or claim 8, wherein the step for modifying the paper substrate includes compressing a portion of the paper substrate.

12. A method of claim 7 or claim 8, wherein the step for modifying the paper substrate includes shaving off a portion of the paper substrate.

13. A method of claim 7 or claim 8, wherein the step for modifying the paper substrate includes embossing a portion of the paper substrate and shaving off a portion of the paper substrate.

14. A method of claim 7 or claim 8, wherein the step for modifying the paper substrate includes embossing a portion of the paper substrate and compressing a portion of the paper substrate.

15. A method of claim 7 or claim 8, wherein the step for modifying the paper substrate includes embossing a portion of the paper substrate, shaving off a portion of the paper substrate, and compressing a portion of the paper substrate.

* * * * *